United States Patent
Nishida et al.

(10) Patent No.: US 6,832,976 B2
(45) Date of Patent: Dec. 21, 2004

(54) SHIFT CONTROL APPARATUS FOR AUTOMATIC TRANSMISSION

(75) Inventors: Masaaki Nishida, Anjo (JP); Hiroshi Tsutsui, Anjo (JP); Kouichi Kojima, Anjo (JP); Yutaka Teraoka, Anjo (JP); Kiyoshi Akutsu, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/412,261

(22) Filed: Apr. 14, 2003

(65) Prior Publication Data

US 2004/0043857 A1 Mar. 4, 2004

(30) Foreign Application Priority Data

May 17, 2002 (JP) ..................... 2002-143902

(51) Int. Cl.[7] ................. F16H 59/48; F16H 31/00
(52) U.S. Cl. ................. 477/120; 475/118; 475/125
(58) Field of Search .............. 477/120, 143–148, 477/154–158; 475/116, 118, 121, 125

(56) References Cited

U.S. PATENT DOCUMENTS 5,924,958 A * 7/1999 Tsuchiya et al. ............ 477/145
6,270,444 B1    8/2001  Tsutsui et al.
2002/0086760 A1  7/2002  Hayabuchi et al.
2002/0086761 A1  7/2002  Hayabuchi et al.
2002/0151409 A1 * 10/2002  Hayabuchi et al. ......... 477/158

FOREIGN PATENT DOCUMENTS

JP          2003336737 A  * 11/2003  ........... F16H/61/08

* cited by examiner

*Primary Examiner*—Tisha Lewis
(74) *Attorney, Agent, or Firm*—Oliff & Berridge, PLC

(57) ABSTRACT

An automatic transmission achieves a desired shift through an initial stage shift in which a first engagement element is released and a third engagement element is engaged, and a final stage shift in which a second engagement element is released and a fourth engagement element is engaged. A control apparatus sets an estimated rotation acceleration for a transmission input shaft in accordance with an input torque and an input torque rotation acceleration speed, and controls the release of the second engagement element for moving to the final stage shift according to the estimated rotation acceleration. As a result, it is possible to prevent a shifting delay and/or degradation that occurs between the initial stage and the latter stage by continuous transmission of the input rotation (engine rotation) change when moving from the initial stage to the later stage.

16 Claims, 11 Drawing Sheets

|  | C-1 | C-2 | C-3 | B-1 | B-2 | B-3 | F-1 | F-2 |
|---|---|---|---|---|---|---|---|---|
| P |  |  |  |  |  |  |  |  |
| R |  |  | ○ |  |  | ○ |  |  |
| N |  |  |  |  |  |  |  |  |
| 1st | ○ |  |  |  |  | △ |  | ○ |
| 2nd | ○ |  |  | △ | ○ |  | ○ |  |
| 3rd | ○ |  | ○ |  | ● |  |  |  |
| 4th | ○ | ○ |  |  | ● |  |  |  |
| 5th |  | ○ | ○ |  | ● |  |  |  |
| 6th |  | ○ |  | ○ | ● |  |  |  |

SHIFT CONTROL APPARATUS FOR AUTOMATIC TRANSMISSION

INCORPORATION BY REFERENCE

The disclosure of Japanese Patent Application No. 2002-143902 filed on May 17, 2002 including the specification, drawings and abstract are incorporated herein by reference in its entirety.

BACKGROUND OF THE INVENTION

1. Field of Invention

The invention relates to a shift control apparatus for an automatic transmission and in particular relates to an art which smoothly executes shifting that requires two different engagement elements to be released and engaged (i.e., simultaneous changeover of four elements) when shifting among shift speeds.

2. Description of Related Art

An automatic transmission achieves a plurality of shift speeds by changing a gear ratio by switching a power transmission route, via speed-changing elements structured as planetary gears, using engagement and release of friction engagement elements. To achieve this, it is necessary to execute engagement and release of the friction engagement elements during shifting using, as far as possible, simple hydraulic control, while inhibiting the generation of shift shock. Accordingly, generally, an operation of the engagement elements for upshifting and downshifting is executed based on a so-called engagement element changeover operation. This operation is fundamentally based on an operation in which, in order to achieve a particular shift speed, with respect to a plurality or a single engagement element in an engaged state, another engagement element is additionally engaged, or alternatively, one of the engagement elements in the engaged state is released. However, depending on the gear train structure, there are cases when a so-called changeover operation is executed in which the engaged engagement element is released while the other engagement element is engaged.

Recently, there has been a tendency toward adopting multiple speeds in automatic transmissions in order to respond to demands for improved drivability and energy conservation through a reduction in fuel consumption. Adopting multiple speeds in automatic transmissions that is generally achieved by adding an acceleration shift speed or a deceleration shift speed to a speed change mechanism formed from multiple planetary gear sets, using an overdrive or underdrive gear, respectively. However, as disclosed in Japanese Patent Application-Laid Open No. 4-219553, an alternative approach achieves multiple speeds using a different configuration in which an input to a Ravigneaux type planetary gear set is split into a high-low dual system.

In a multiple speed gear train like that described above, there is a wide selection range of shift speeds that may correspond well with the running state of the vehicle. Accordingly, the changeover operation of the engagement elements does not simply require changeover of two elements, but instead a complicated changeover of four elements becomes necessary. An example of when this four element changeover becomes necessary is a so-called "jump shift," in which shifting is performed at one time from one shift speed among multiple shifting speeds to a particular shift speed. When a multiple changeover operation of the four elements is executed, how to control the order of engagement and release of each engagement element, timing, and the like, are important issues. Depending on the type of control, smooth progression of the shifting that takes places within the transmission is impaired, which may cause a discontinuity in shifting. As a result, step-like shocks may occur during shifting, with a particularly substantial shock at the completion of shifting, or alternatively, the time required for shifting becomes longer than desired.

SUMMARY OF THE INVENTION

In view of the foregoing problems, it is an objective of the invention to provide a shift control apparatus for an automatic transmission which can inhibit the occurrence of shock during shifting while also preventing a delay between shifting, by executing shifting progression smoothly when shifting which requires engagement and release of the four engagement elements occurs.

According to an exemplary embodiment of the invention, when shifting from a first shift speed to a second shift speed, a state prior to initiation of release of a second engagement element, which acts as one of the engagement elements that are released, is controlled in accordance with a predetermined estimated rotation acceleration. As a result, an input shaft rotation acceleration during a period up to initiation of release of the second engagement element is controlled, thus making it possible for shifting to progress in accordance with an input torque at the time of shifting. Accordingly, it is possible to inhibit the generation of inertia torque caused by change of the rotation acceleration during shifting, and reduce shift shock. Moreover, it is possible to complete shifting in a shift time that accords with the input torque.

Furthermore, the exemplary embodiment of the invention may be structured such that, when shifting from the first shift speed to the second shift speed, control is executed in accordance with an input shaft rotation acceleration during release of a first engagement element that acts as the other engagement element that is released, and the input torque, prior to the release of the second engagement element. As a result, in the case that the input torque decreases during shifting, shifting progresses in line with the input shaft rotation acceleration at the time of release of the first engagement element. Thus, pleasant shifting is achieved between release of the first engagement element and release of the second engagement element.

Moreover, the exemplary embodiment of the invention may be structured such that during a final period of shifting through release of the first engagement element, the inertia torque decreases along with reduction of the input shaft rotation acceleration due to the progression of shifting, or in other words, increase in the input torque is not estimated. As a result, at the time of initiation of release of the second engagement element, a hydraulic pressure of a hydraulic pressure pump becomes high, and it is possible to inhibit both reduction or decrease of the input shaft rotation acceleration, and step-like shocks during shifting.

In addition, the exemplary embodiment of the invention may be structured such that the input shaft rotation acceleration increases when the input torque has increased. As a result, it is not necessary to change the estimated input rotation acceleration along with increase in the input torque. However, if the estimated rotation acceleration is decreased along with the input shaft rotation acceleration when the input torque decreases, the estimated rotation acceleration is decreased in a manner that includes the change of the inertia torque accompanying rotation change. As a result, the estimated rotation acceleration decreases more greatly than is required to accord with the actual input torque, and the shifting progression is delayed. However, by decreasing the estimated rotation acceleration in accordance with the input torque, the estimated rotation acceleration is decreased in a manner that corresponds well with the reduction amount of the input torque. Accordingly, it is possible to appropriately set shifting progression.

In addition, the exemplary embodiment of the invention may be structured such that the estimated rotation acceleration is determined by subtracting a decreased amount of the estimated rotation acceleration, which is determined in accordance with a difference between a maximum value of the input torque up to initiation of release of the second engagement element and the present input torque, from the maximum value of the input shaft rotation acceleration up to initiation of release of the second engagement element. As a result, it is possible to accurately determine the estimated rotation acceleration that corresponds with the input torque, and thus it is possible to set shifting progression appropriately.

Furthermore, the exemplary embodiment of the invention may be structured such that variation of the inertia torque of the rotation change due to feedback of the final period of release of the first engagement element is not estimated. As a result, it is possible to inhibit change of the input shaft rotation acceleration in the final period of release of the first engagement element.

Moreover, the exemplary embodiment of the invention may be structured such that the hydraulic pressure of the second engagement element is determined based upon the input shaft rotation acceleration, particularly in the case when the input rotation acceleration is still small with respect to the estimated rotation acceleration and the inertia torque is small, during an initial period of shifting initiated by release of the first engagement element. As a result, there is no over-reduction of the hydraulic pressure for engagement of the second engagement element, and thus it is possible to prevent the release from becoming too rapid.

Furthermore, the exemplary embodiment of the invention may be structured such that it is possible to maintain the state prior to release of the second engagement element in the same state as that immediately prior to the release. As a result, the release of the second engagement element is inhibited from occurring too early with respect to an operation of the other engagement side engagement element, and at the same time, it is possible to swiftly move to the release operation.

Furthermore, the exemplary embodiment of the invention may be structured so as to prevent the release of the second engagement element occurring too early with respect to the operation of the other engagement element to be engaged. As a result, it is possible to prevent the engine from racing during shifting.

Moreover, the exemplary embodiment of the invention may be structured so as to maintain the second engagement element in a state in which the second engagement element can respond quickly to the release operation, while at the same time preventing the release from occurring too early with respect to the operation of the other engagement element to be engaged.

In addition, the exemplary embodiment of the invention may be structured such that it is possible to set inertia torque to an appropriate state according with a degree of progression of shifting caused by the release of the first engagement element, while obtaining a shift time according with the input torque. As a result, it is possible to swiftly move to initiation of release of the second engagement element.

Furthermore, the exemplary embodiment of the invention may be structured such that engagement of a third engagement element with respect to release of the first engagement element, and engagement of a fourth engagement element with respect to the second engagement element are caused to occur in a prescribed order. Accordingly, it is possible to simplify the control required for changeover of the four engagement elements.

Moreover, the exemplary embodiment of the invention may be structured such that release of the second engagement element is initiated immediately prior to complete engagement of the third engagement element. Accordingly, it is possible to limit the time of a shifting state in which the four engagement elements are sliding to an extremely short period.

Furthermore, the exemplary embodiment of the invention may be structured such that release of the second engagement element is initiated after initiation of engagement of the third engagement element and prior to complete engagement of the third engagement element. Accordingly, a shift delay and/or degradation occurring along with initiation of engagement of the third engagement element is offset by engine racing caused by the smooth release of the second engagement element. Thus, from the point of view of overall shifting, it is possible to provide continuous smooth shifting.

Next, the exemplary embodiment of the invention may be structured such that a shift from the first shift speed to the second shift speed is achieved by moving via a shift from the first shift speed to a third shift speed achieved by operation of two of the engagement elements, to a shift from the third shift speed to the second shift speed achieved by operation of two of the engagement elements. As a result, it is no longer necessary to synchronously control three or more of the engagement elements at one time. Accordingly, it is possible to favorably improve controllability, and prevent the generation of shift shock. In addition, on the occasion of shifting, control is executed such that release of the second engagement element for shifting from the third shift speed to the second shift speed agrees or corresponds well with the state of shifting from the first shift speed to the third shift speed. Accordingly, it is possible to make the overall shifting continuous, and to improve driveability.

In addition, the exemplary embodiment of the invention may be structured such that it is possible to align the release operation of the second engagement element, that is released when moving to the second shift speed, with the state when moving from the first shift speed to the third shift speed. As a result, it is possible to make the move from the first shift speed to the third shift speed, and the third shift speed to the second shift speed continuous. Accordingly, it is possible to make the shift to the second shift speed via the third shift speed feel, from the point of view of human perception, like a single shift.

Moreover, the exemplary embodiment of the invention may be structured such that, even in the case that the input torque decreases during downshifting, control is executed to inhibit delay of the release of the second engagement element, in the same manner as downshift in which the input torque is substantially constant.

BRIEF DESCRIPTION OF THE DRAWINGS

The invention will be described with reference to the drawings, in which.

DETAILED DESCRIPTION OF PREFERRED EMBODIMENTS

Figure 1:
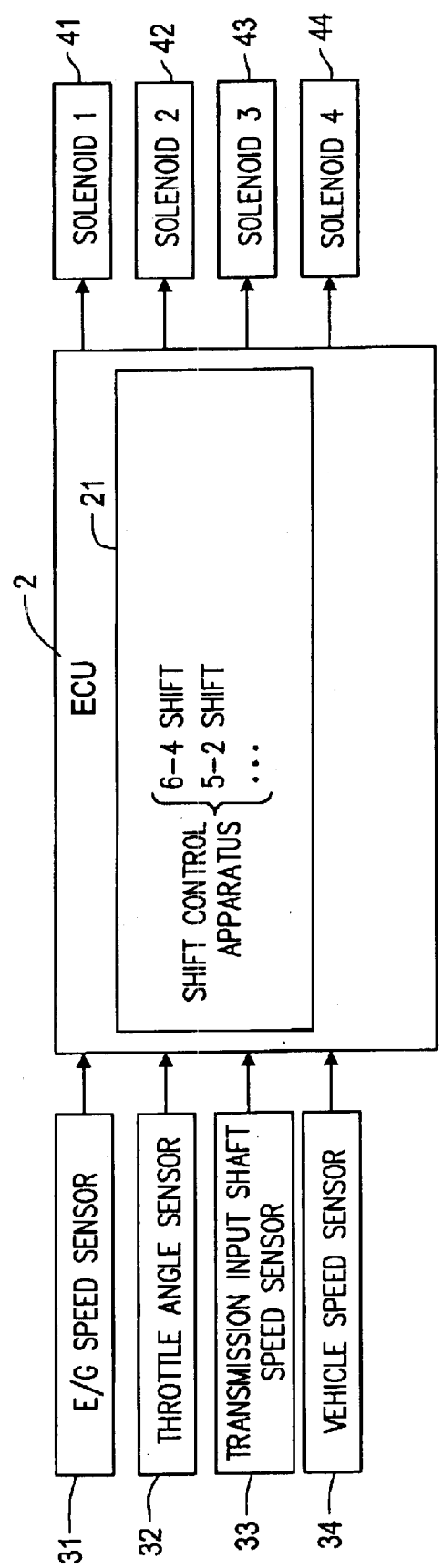
FIG. 1 is a block diagram showing a system configuration of a signal system of a control apparatus of an automatic transmission according to an embodiment of the invention.

An embodiment of the invention will be described with reference to the drawings. FIG. 1 is a block diagram showing a system configuration of a signal system of a control apparatus. As can be seen, the control apparatus comprises an electronic control apparatus (ECU) 2 which forms the core of the control apparatus, and various sensors that act as an input unit for inputting information of various types to the ECU 2. More particularly, these sensors include an engine (E/G) speed sensor 31 that detects an engine speed of a vehicle; a throttle angle sensor 32 that detects an engine load; a transmission input shaft rotation speed sensor 33 that detects an input rotation of a transmission; and a vehicle speed sensor 34 that detects a vehicle speed from an output shaft rotation of the transmission. Furthermore, the control apparatus is also configured from a plurality of solenoids that act as an output unit actuated by an output of a driving signal based on control information. That is, solenoids 1 to 4 which act as actuators for each of a solenoid valve 41 to 44 are provided in a hydraulic pressure control apparatus that will be described hereinafter with reference to FIG. 5.

Figure 2:
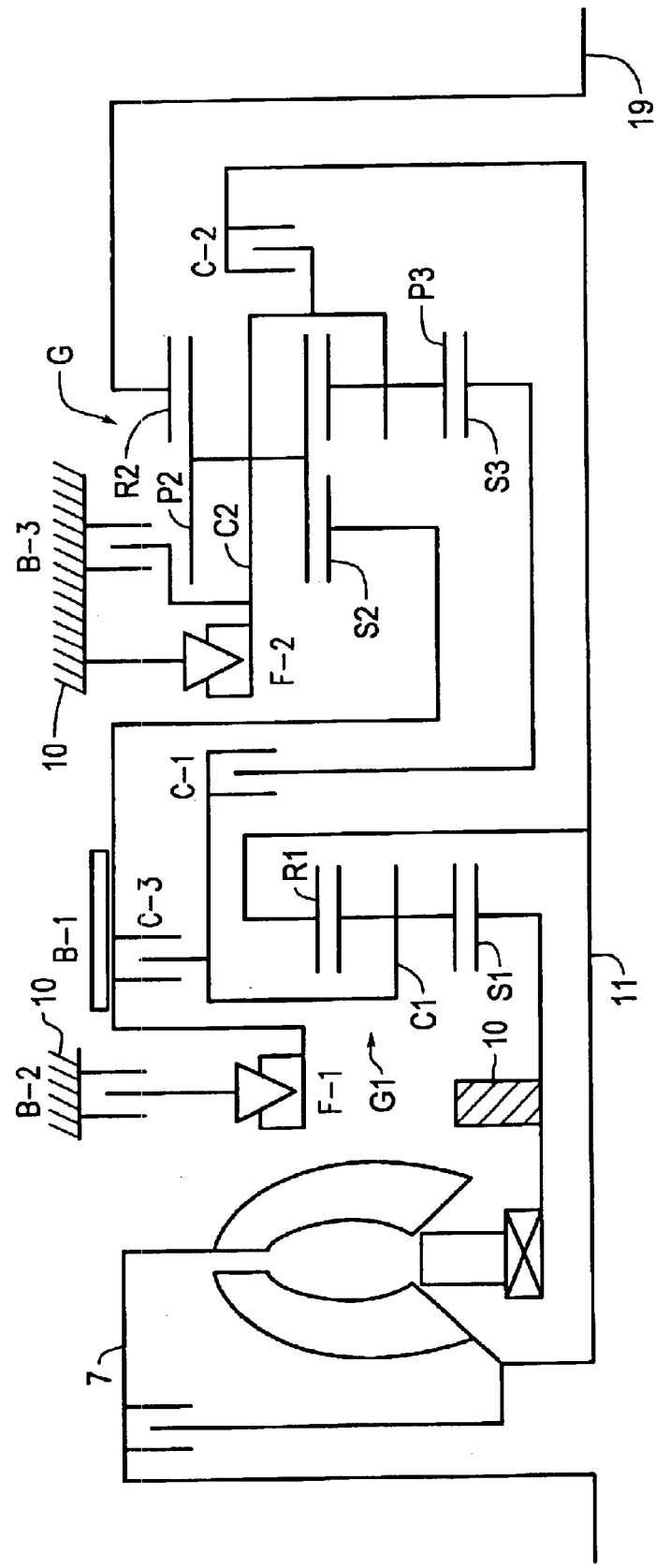
FIG. 2 is a schematic diagram of a gear train of the automatic transmission.

FIG. 2 is a schematic diagram of a six speed gear train for FR automobile use, as an example of a speed change mechanism controlled by the control apparatus. This gear train is configured from; a torque converter 7 having a lock-up clutch; and a six forward speeds and one reverse speed mechanism formed from a combination of a Ravigneaux type planetary gear set G and a simple planetary type reduction gear G1.

The planetary gear set G, which forms the principal element of the speed change mechanism, comprises: two sun gears S2 and S3 having different diameters; one ring gear R2; a long pinion gear P2 which externally touches and meshes with the large diameter sun gear S2, and which also internally touches and meshes with the ring gear R2; a short pinion gear P3 which externally touches and meshes with the small diameter sun gear S3, and which also externally touches and meshes with the long pinion gear P2; and a planet carrier C2 that supports both of the pinion gears P2 and P3. In addition, the planetary gear set G of the small diameter sun gear S3 is coupled with a multi-disc clutch (C-1) (hereinafter, the reference numerals of each engagement element will be noted prior to the respective engagement elements).

The large diameter sun gear S2 is coupled with a C-3 multi-disc clutch and, as well as this, can be locked against an automatic transmission case 10 by a B-1 brake configured from a handbrake. Furthermore, the sun gear S2 can also be locked against the automatic transmission case 10 by an F-1 one way clutch which is parallel to C-3 clutch and a multi-disc B-2 clutch. Moreover, the planet carrier C2 is coupled with an input shaft 11 via a C-2 clutch as a multi-disc engagement element, and can be locked against the automatic transmission case 10 by a multi-disc B-3 brake, and can have rotation in one direction stopped through engagement with the automatic transmission case 10 by the F-2 one way clutch. In addition, the ring gear R2 is coupled with an output shaft 19.

The reduction planetary gear G1 is configured from a simple planetary gear. The ring gear R1 acting as an input element thereof is coupled to the input shaft 11. The planet carrier C1 acting as an output element is coupled to the small diameter sun gear S3 via the C-1 clutch and, as well as this, is coupled to the larger diameter sun gear S2 via the C-3 clutch. Furthermore, the sun gear S1 acting as a holding element receiving reaction force is fixed to the automatic transmission case 10.

Figures 3, 4:
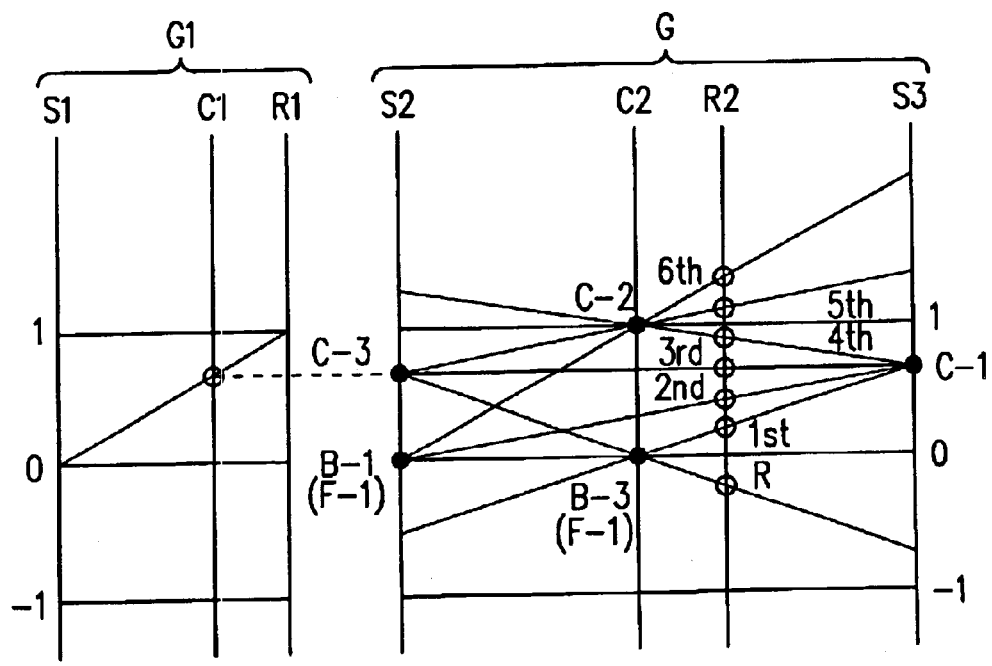
FIG. 3 is an engagement chart showing a relationship of each shift speed achieved by the gear train and engagement and release of each engagement element.
FIG. 4 is a speed chart of the gear train.

FIG. 3 shows an engagement chart showing a relationship between engagement and release of each engagement element (namely, the clutches, brakes and one way clutches) and an achieved shift speed, in the case of the above automatic transmission. Within the engagement chart, a white circle (○) indicates engagement; no mark indicates release; a white triangle (Δ) indicates engagement to realize engine brake; and a black circle (●) indicates engagement which has no direct influence on realizing shift speed. Furthermore, FIG. 4 is a speed chart showing a relationship between the shift speed achieved by engagement of each clutch, brake and one way clutch (the engagements shown by the black circle (●)) and a speed ratio of each shift element at each given time.

By referring to both figures in conjunction, it is clearly apparent that a first speed (1st) is achieved by engagement of the C-1 clutch and the B-3 brake (in this embodiment, as is obvious from the engagement chart, automatic engagement of the F-2 one way clutch is utilized in place of engagement of the B-3 brake). The reason for using this engagement is because an engagement force of the F-1 one way clutch is automatically released along with engagement of the B-1 brake. Accordingly, complicated hydraulic pressure control for changeover of the B-3 brake and the B-1 brake (that would be necessary when shifting from a first shift speed to the second shift speed, as described later) can be avoided, and a simplified control of release of the B-3 brake is achieved. Thus, the engagement of the F-2 one way clutch is equivalent to engagement of the B-3 brake.) In this case, reduced-speed rotation that is transmitted via the reduction planetary gear G1 from the input shaft 11, is input to the small diameter sun gear S3 via the C-1 clutch. Reaction force is received by the planet carrier C2 which is held by engagement of the F-2 one way clutch, and a reduced-speed rotation of the maximum speed reduction ratio of the ring gear R2 is output to the output shaft 19.

Next, a second speed (2nd) is achieved by engaging the F-1 one way clutch and engaging the B-2 brake, the latter making the former effective. These engagements correspond to engagement of the C-1 clutch and B-1 brake. The reason why these engagements correspond to engagements of the B-1 brake engagement are explained later. In this case, reduced-speed rotation which is transmitted via the reduction planetary gear G1 from the input shaft 11, is input to the small diameter sun gear S3 via the C-1 clutch, and the reaction force thereof is absorbed by the large diameter sun gear S2 which is held by engagements of the B-2 brake and the F-1 one way clutch, and the reduced-speed rotation of the ring gear R2 is output to the output shaft 19. The speed reduction ratio at this time becomes smaller than that of first speed (1st), as can be seen from FIG. 4.

Furthermore, a third speed (3rd) is achieved by synchronously engaging the C-1 clutch and the C-3 clutch. In this case, reduced-speed rotation that is transmitted via the reduction planetary gear G1 from the input shaft 11 is simultaneously input to the small diameter sun gear S3 and the small diameter gear S2 via the C-1 clutch and the C-3 clutch. As a result of the planetary gear set G entering a directly coupled state, the input rotation of the ring gear R2 which is the same as the input rotation to both sun gears is output to the output shaft 19 as reduced-speed rotation, in contrast to the rotation of the input shaft 11.

Next, a fourth speed (4th) is achieved by synchronously engaging the C-1 clutch and the C-2 clutch. In this case, on one hand, decreased-speed rotation that is transmitted via the reduction planetary gear G1 from the input shaft 11 is input to the small diameter sun gear S3 via the C-1 clutch. On the other hand, non-decreased speed rotation that is transmitted via the C-2 clutch from the input shaft 11 is input to the planet carrier C2, and a rotation having speed between the two input rotations is output to the output shaft 19 as the rotation of the ring gear R2. This rotation of the ring gear R2 has slightly decreased speed, as compared to that of the rotation of the input shaft 11.

Moreover, a fifth speed (5th) is achieved by synchronously engaging the C-2 clutch and the C-3 clutch. In this case, on one hand, decreased-speed rotation that is transmitted via the reduction planetary gear G1 from the input shaft 11 is input to the large diameter sun gear S2 via the C-3 clutch. On the other hand, non-decreased speed rotation that is transmitted via the C-2 clutch from the input shaft 11 is input to the planet carrier C2, and rotation is output to the output shaft 19. This output rotation has a slightly faster speed than that of the rotation of the input shaft 11 of the ring gear R2.

In addition, a sixth speed (6th) is achieved by engagements of the C-2 clutch and the B-1 brake. In this case, non-decreased speed rotation that is transmitted via the C-2 clutch from the input shaft 11 is input to only the planet carrier C2, reaction force is received by the sun gear S2 held by engagement of the B-1 brake, and the further increased speed rotation of the ring gear R2 is output to the output shaft 19.

Finally, a reverse speed (R) is achieved by engagements of the C-3 clutch and the B-3 brake. In this case, decreased-speed that is transmitted via the reduction planetary gear G1 from the input shaft 11 is input to the large diameter sun gear S2 via the C-3 clutch. Reaction force is received by the planet carrier C2 held by engagement of the B-3 brake, and the reverse rotation of the ring gear R2 is output to the output shaft 19.

At this point, the relationship of the F-1 one way clutch and both of the B-1 and B2 brakes, which was referred to earlier, will be explained. In this case, the engagement direction of the F-1 one way clutch coupled to the sun gear S2 is aligned with the counter torque support direction of the larger diameter sun gear S2 in the second speed. Accordingly, it is possible for the F-1 one way clutch to exert substantially the same function as engagement of the B-1 brake. However, the large diameter sun gear S2, in contrast to the planet carrier C2, is not only engaged to obtain an engine brake effect during the second speed, but is also the engagement element held in order to achieve the sixth speed. As a result, use of the B-1 brake becomes necessary. Furthermore, the large diameter sun gear S2, as is shown in the speed chart of FIG. 4, revolves in the opposite direction to the input rotation direction when the first speed is achieved. However, in the case of the shift speeds from the third speed and upwards, the large diameter sun gear S2 revolves in the same direction as the input rotation direction. Accordingly, it is not possible to couple the F-1 one way clutch directly to a fixed member. Thus, the F-1 one way clutch is configured such that control of the effectiveness of the engagement state is possible due to the F-1 one way clutch being disposed in-line with the B-2 brake.

Each shift speed achieved in this manner, as can be qualitatively understood by referring to the speed ratios of the ring gear R2 which are indicated by distances between the white circles (o) in the vertical direction, shown in the speed chart of FIG. 4, has a favorable speed step with a comparatively equal distance between itself and each other shift speed. With this gear train, it is not necessary to execute multiple changeover of the engagement elements during normal upshift and downshift between adjacent shift speeds. However, during a jump shift, this is necessary. It should be noted that downshifts in which the need for jump shift occurs particularly are a 6th to 3rd speed jump shift and a 5th to 2nd speed jump shift. However, in these shifts, automatic engagement of the F-1 one way clutch fulfils the same function as engagement of the B-1 brake, since the B-2 brake is normally engaged for speeds above the second speed in order to make control of the B-2 brake more simple.

Figure 5:
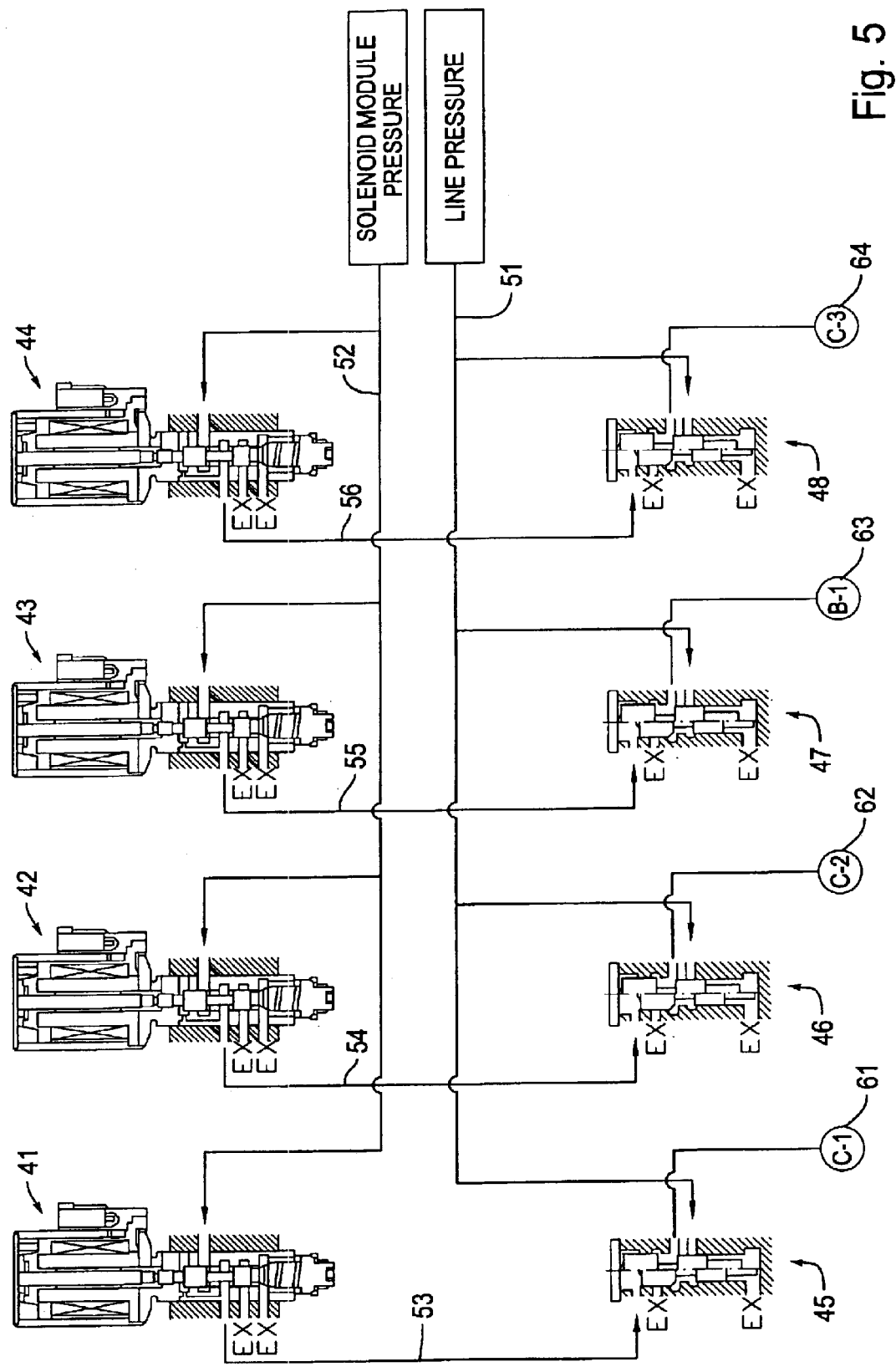
FIG. 5 is a hydraulic pressure passage diagram of an operation system of the control apparatus.

The hydraulic pressure control apparatus uses an operation of a hydraulic servo of each of the clutches and brakes for controlling the speed change mechanism structure as described above. In this hydraulic pressure control apparatus, each hydraulic servo of each of the engagement elements adopts a structure in which the servo is individually, independently and directly controlled by a dedicated solenoid valve using the solenoid driving signal from the ECU 2. FIG. 5 shows a specific passage structure. As can be seen, in the hydraulic passage, each of a control valve 45 to 48 are connected in parallel to a line pressure hydraulic passage 51 connected to a line pressure supply passage, shown by a block in the figure. The line pressure herein refers to a maximum passage pressure capable of maintaining each engagement element in an engaged state in accordance with a running load of a vehicle. The specific structure of this line pressure supply passage has been omitted in the figure. Each control valve is configured such that an operation adjusts in accordance with a solenoid pressure applied by the solenoid valves 41 to 44, respectively.

More particularly, a hydraulic servo 61 of the C-1 clutch is connected to the line pressure hydraulic passage 51 via the C-1 control valve 45, and a spool end of the C-1 control valve 45 is connected to a solenoid modulator pressure hydraulic passage 52 via the solenoid valve 41. The solenoid modulator pressure herein refers to a line pressure that has reduced pressure due to being passed via a modulator. This pressure reduction is performed in order to increase a regulated pressure gain caused by the solenoid valve. The C-1 control valve 45 is a spool valve provided with lands having a diameter difference between either end. This C-1 control valve 45 adopts a structure such that (a) by applying a solenoid signal pressure to the large diameter land end in resistance to a spring load applied to the small diameter land end, a drain port is closed by the large diameter land; (b) while the small diameter land constricts a portion between the in-port communicated to the line hydraulic pressure passage 51 and an out-port communicated to the hydraulic servo 61, the line pressure hydraulic passage 51 and the hydraulic servo 61 are communicated. As a result of the solenoid pressure release, the small diameter land is closed, the drain port is opened by the large diameter land, and the hydraulic servo 61 is connected to the drain. On the other hand, the solenoid valve 41 is a normally-open linear solenoid valve. This solenoid valve 41 is structured such that solenoid pressure is regulated by: regulation of constriction of a portion between a solenoid modulator hydraulic passage 52 and a solenoid pressure passage 53 by a load applied to a plunger in resistance to a spring load applied to one end of a spool having lands at both ends, like the C-1 control valve 45; and regulation of a drain amount of the solenoid pressure hydraulic passage 53. It should be noted, with regard to the C-2 clutch, the B-1 brake and the C-3 clutch, they adopt a parallel passage structure formed from the control valves 46, 47 and 48, the solenoid valves 42, 43 and 44, and the solenoid hydraulic pressure passages 54, 55 and 56, that connect these valves, respectively, with all of these elements being, respectively, exactly the same.

The automatic transmission formed with this structure requires operation of the four engagement elements (the C-1 clutch, the C-2 clutch, the C-3 clutch, and the B-1 brake) when shifting, for example, in the case that the first shift speed is the sixth speed and the second shift speed is the third speed (which is separated by three speeds from the sixth speed) namely, when executing the 6th to 3rd speed shift. In this case, the first shift speed (the sixth speed) is achieved by engagement of a first and a second engagement element (the B-1 brake and the C-2 clutch), and the second shift speed is achieved by engagement of a third and a fourth engagement element (the C-1 clutch and the C-3 clutch). Moreover, when shifting, in the case that the first shift speed is the fifth speed, from the fifth speed to the second speed, which is separated by three speeds from the fifth speed, operation of the four engagement elements (the C-1 clutch, the C-2 clutch, the C-3 clutch, and the F-1 one way clutch) is also necessary. In this case, the first engagement element is the C-2 clutch, the second engagement element is the C-3 clutch, the third engagement element is the C-1 clutch, and the fourth engagement element is the F-1 one way clutch. At this point, in order to accommodate for shifting like this, the shift control apparatus according to the present invention is provided with a shift control unit 21 (refer to FIG. 1) that: initiates release of the second engagement element (the C-2 clutch or the C-3 clutch) following initiation of release of the first engagement element (the B-1 brake or the C-1 clutch); then completely engages the fourth engagement element (the C-3 clutch or the F-1 one way clutch) following completion of engagement of the third engagement element (the C-1 clutch); and initiates release of the second engagement element (the C-2 clutch or the C-3 clutch) prior to completing engagement of the third engagement element (the C-1 clutch).

The above described release and engagement are each of the engagement elements, includes states of transitional slip that are prior to full release and full engagement. Accordingly, initiation of release refers to when slip of the engagement element begins. Put in terms of the engagement elements operated by hydraulic pressure, initiation of release refers to the beginning of slip due to a reduction in an engagement force. In terms of the one way clutch which is not operated by hydraulic pressure, initiation of release refers to the one way clutch becoming free along with change in a rotation direction of a rotating member. Similarly, completion of engagement refers to when slip of the engagement element ceases. Accordingly, completion of engagement, in the case of the engagement elements operated by hydraulic pressure, refers to when slip ceases as a result of an increase in the engagement force. In the case of the one way clutch which is not operated by hydraulic pressure, completion of engagement refers to locking of the one way clutch along with change of the rotation direction of the rotation element.

In this embodiment, in addition, the shift control unit 21 is such that with respect to the first shift speed (the sixth speed or the fifth speed) and the later shift speed (the third speed or the second speed), it sets the third shift speed (the fourth speed or the third speed) achieved by operation of the two engagement elements (the C-1 clutch and the B-1 brake), and after that the second shift speed (the third speed or the second speed) is achieved. Thus, the shift control unit 21 is capable of shifting from the first shift speed (the sixth speed or the fifth speed) to the second shift speed (the third speed or the second speed) by moving to a shift from the third shift speed (the fourth speed or the third speed) to the second shift speed (the third speed or the second speed) via a shift from the first shift speed (the third speed or the second speed) to the third shift speed (the fourth speed or the third speed). The four engagement elements in this case include the C-1 clutch engaged when shifting to the third shift speed (the fourth shift speed or the third speed); the B-1 brake or the C-2 clutch released when shifting to the third shift speed; the C-3 clutch or the F-1 one way clutch engaged when shifting to the second shift speed (the third speed or the second shift speed); and the C-2 clutch or the C-3 clutch released when shifting to the second shift speed.

Next, a specific configuration of the shift control unit 21 in the case of shifting from the 6th speed to the 3rd speed will be explained as an example. The shift control unit 21 in this embodiment is configured as a program within the control apparatus. This shift control unit 21 executes shifting using control of the hydraulic servos 61 to 64 of each of the engagement elements, through operation of the solenoid valve 42 by the solenoid driving signal output based on the program.

Figure 6:
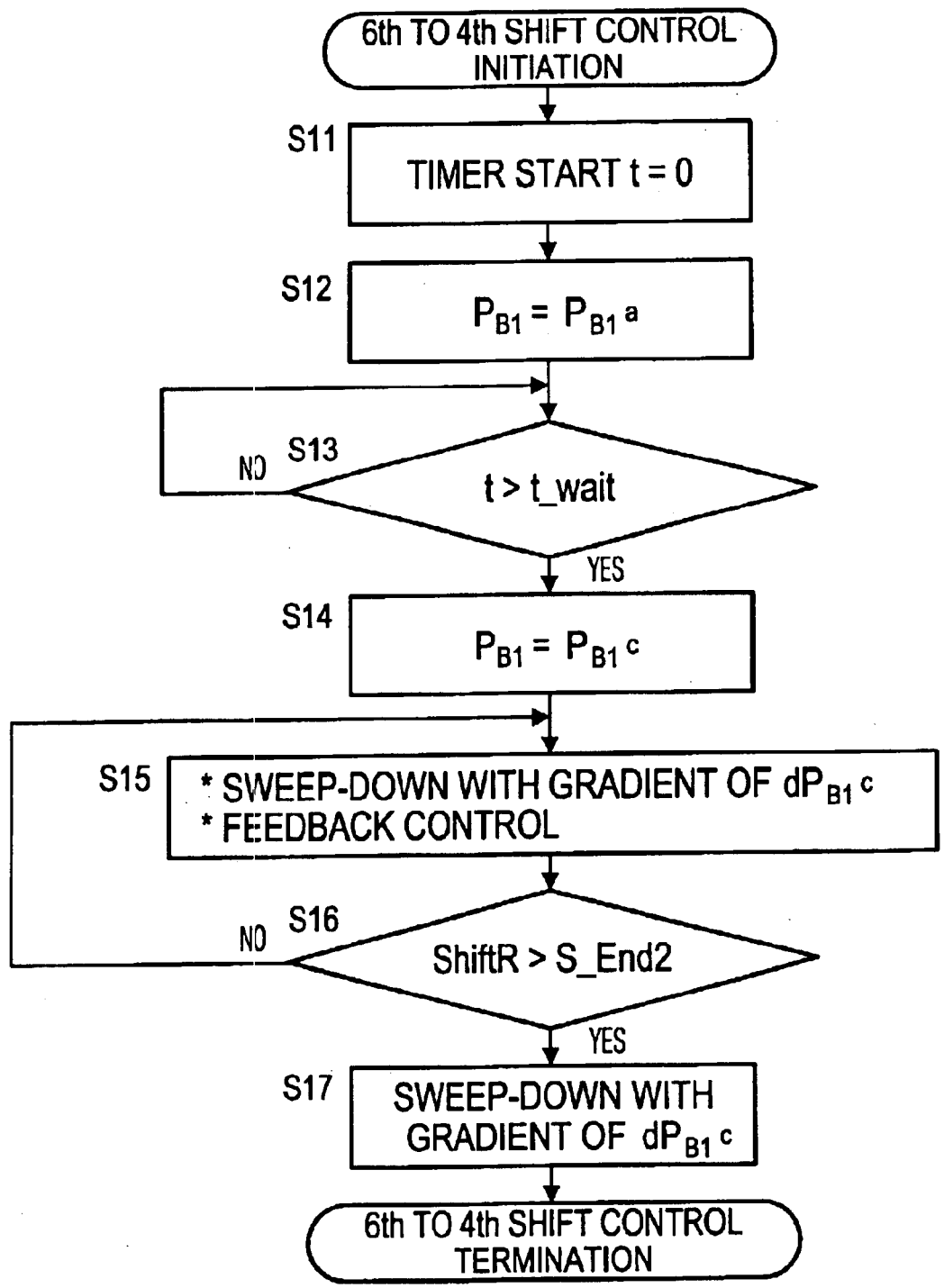
FIG. 6 is a flow chart of a B-1 brake release control when shifting from a 6th to a 3rd speed.

First, FIG. 6 shows a control flow for releasing the B-1 brake which is the first engagement element. This control is initiated by starting a timer (time start, t=0) in step S11 based on a shift command. Next, processing is executed in step S12 such that a servo hydraulic pressure is temporarily maintained at a predetermined pressure slightly lower than an engagement pressure ($P_{B1}=P_{B1}a$). This processing prevents engine racing due to variation in the C-1 clutch operation caused by individual differences or variations with time of each transmission. A time for which this constant pressure is maintained is monitored in the next step S13 based on the initially set timer time, and this monitoring continues until a determination is made (time t>t_wait). Once the time has passed, in step S14, a release initiation processing ($P_{B1}=P_{B1}c$) of the B-1 brake is executed in which the servo hydraulic pressure is reduced at one time to the predetermined pressure. Next, while processing is executed (feedback controlled and sweep down at an gradient of $dP_{B1}c$) in which the servo hydraulic pressure is gradually reduced under feedback control, next, in addition, a shift progression state (shift R) determination is executed in step S16. More specifically, this hydraulic pressure control processing, controls a current value of the driving signal to the solenoid 3 shown in FIG. 1, and actuates a pressure regulation of the solenoid valve 43 shown in FIG. 5. This results in processing in which the hydraulic pressure of the hydraulic servo resulting from the control valve 47 decreases at the gradient of $dP_{B1}c$ due to the solenoid pressure of the solenoid valve 43. It will be noted that a relationship of the driving signal and the servo pressure is the same throughout all of the hydraulic pressure control. Furthermore, the input shaft speed or the hydraulic pressure of the hydraulic servo can be used as a determination index for the shift progression state (Shift R). In this embodiment, however, the input shaft speed is used for the determination index. The shift progression state (Shift R) is indicated by the following equation:

Shift $R$=(transmission input speed−gear ratio prior to shift×transmission output speed)×100/transmission output speed×(gear ratio after shift−gear ratio prior to shift)[%].

The shift progression state (Shift R) is calculated based on detected values from the input shaft speed sensor 33 and the vehicle speed sensor 34 shown in FIG. 1. The reference value in this determination (S_End 2) is set at, for example, 70%. In this case, initially, the progression state determination is not satisfied (No) and thus a loop returning to step S15 is repeated. After doing so, if the progression state determination is satisfied in step S16 (Shift R>S_End 2), in step S17, pressure reduction processing (sweep down at the gradient of $dP_{B1}d$) is executed in order to completely release the servo hydraulic pressure of the B-1 brake. This processing completes itself when the solenoid valve 3 reaches full output, and thus the 6th to 4th speed shift control for releasing the B-1 brake is terminated without executing any particular monitoring determination.

Figure 7:
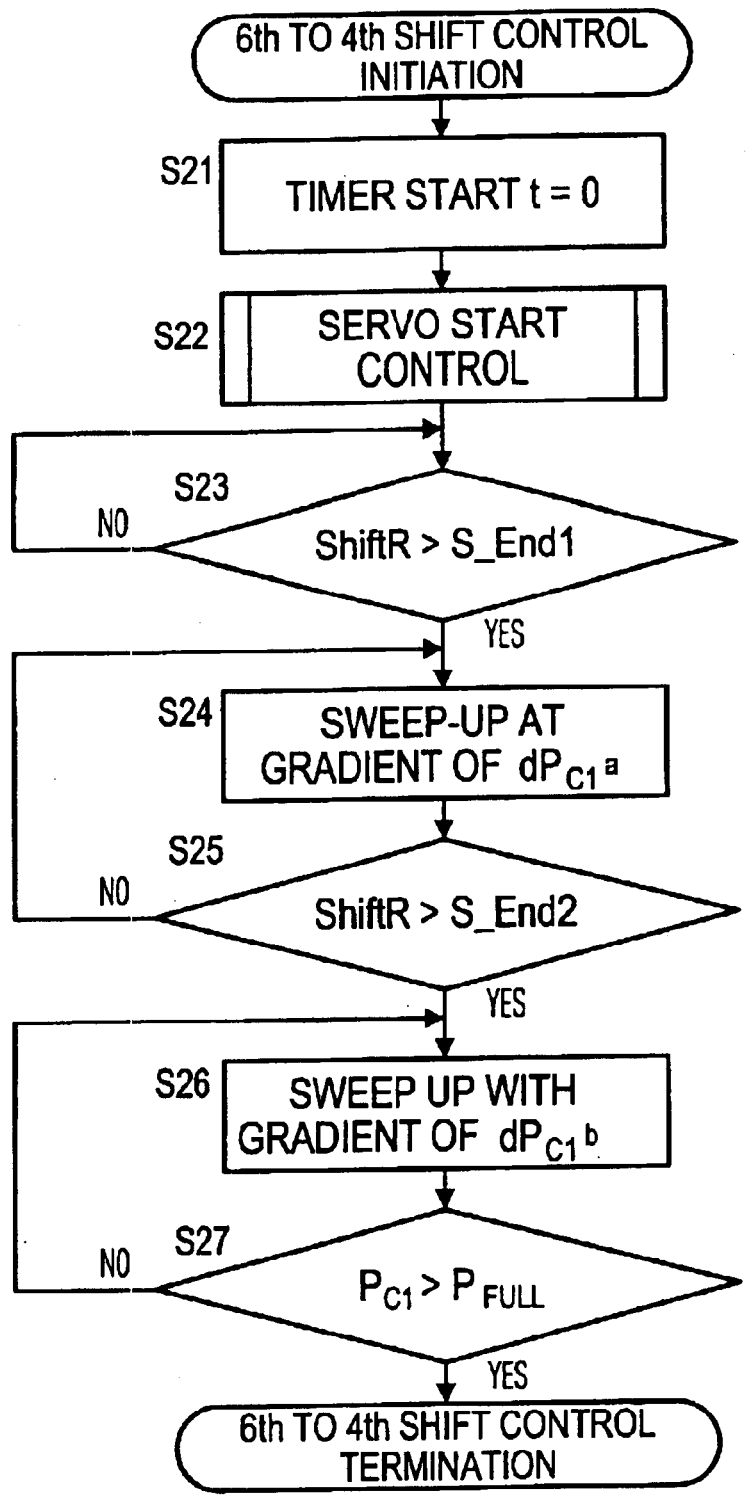
FIG. 7 is a flow chart of a C-1 clutch engagement control when shifting from the 6th to the 3rd speed.

Next, FIG. 7 shows a control flow for engaging the C-1 clutch which is the third engagement element. In this control as well, a timer is started in the initial step S21 (time start t=0). Next, a servo start control sub-routine processing is executed in step S22. This processing includes: a first application of hydraulic pressure for filling a hydraulic servo cylinder of the C-1 clutch is executed; and maintaining of a piston stroke pressure which follows this first application for charging a gap between a hydraulic servo piston and a friction member of the engagement element. This processing is the same as that commonly known and normally executed for clutch engagement. Next, in step S23, the progression state (Shift R) is determined (Shift R>S_End 1) as an index for determining shifting progression. The reference value in this case (S_End 1) is, for example, 70%. Initially this determination is not satisfied (No) and thus the determination continues until shifting progression leads it to be satisfied. When the determination is satisfied (Yes), pressure increase (sweep up at the gradient of $dP_{C1}a$) is initiated for initiating engagement of the C-1 clutch, in step S24. In addition, while this pressure increase is continued, it is determined in step S25, from the shift progression state (Shift R), whether 90% completion is reached prior to the shift speed being synchronous with the fourth shift speed. Initially, this determination is also not satisfied (No), and thus sweep up is continued by returning to step 24 and executing a processing loop, until shift progression leads to the determination being satisfied. When the determination of step S25 is satisfied, next, in step S26, processing is executed in which, this time, the servo hydraulic pressure (sweep up at the gradient of $dP_{C1}b$) is increased as far as line pressure in order to maintain engagement of the C-1 clutch reliably. At the same time, in the next step S27, determination of whether the servo hydraulic pressure has reached the line pressure is repeated. In this way, when the determination of step S27 is satisfied, the 6th to 4th speed shift control for the C-1 clutch engagement control is terminated.

Figure 8:
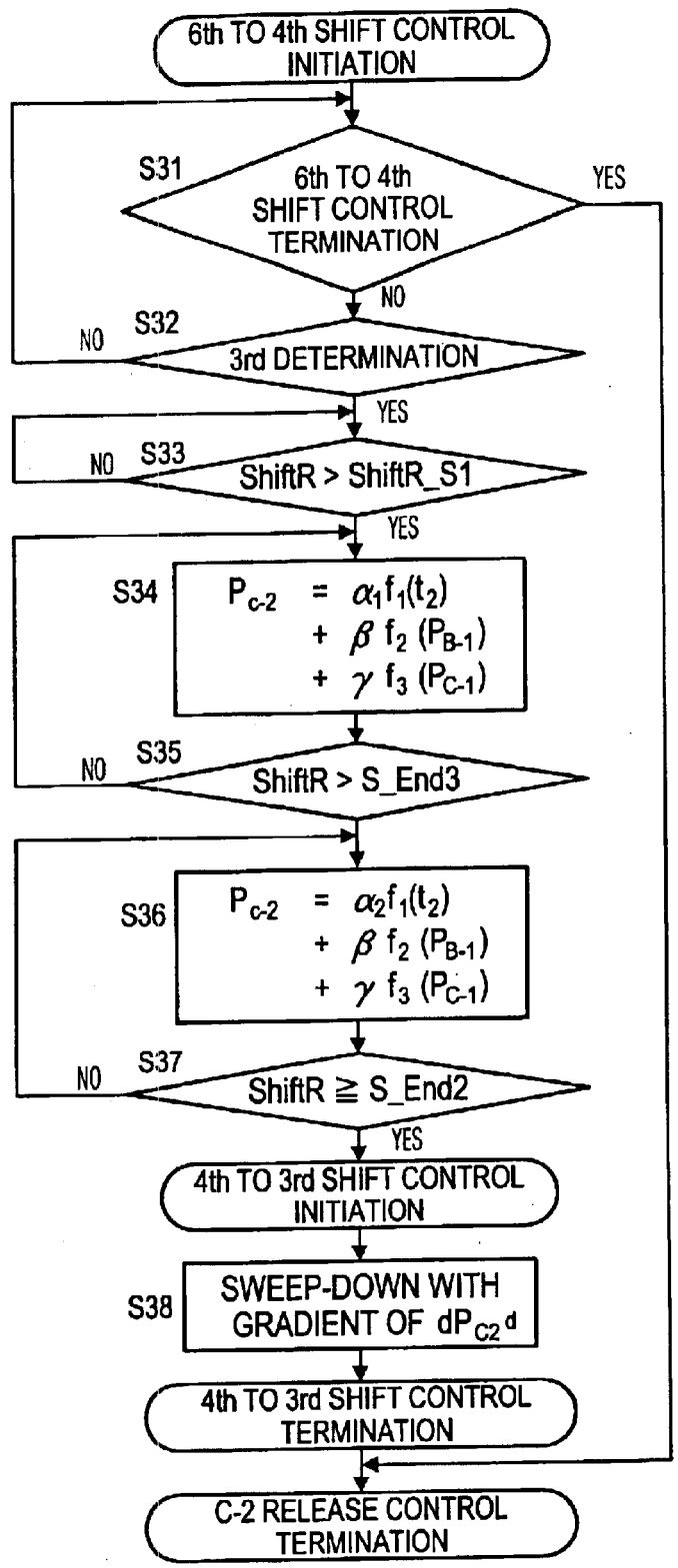
FIG. 8 is a flow chart of a C-2 clutch release control when shifting from the 6th to the 3rd speed.

Next, FIG. 8 shows a control flow for release of the C-2 clutch that is the second engagement element. This control releases the B-1 brake and is initiated during the C-1 clutch engagement control (the 6th to 4th speed shift). A prerequisite of this processing is that the 6th to 4th speed shift has not already finished, since the C-2 release control is not appropriate at such times. Accordingly, so as to exclude this situation, the 6th to 4th speed shift termination determination is executed in the initial step S31. When this determination is satisfied, the following processing is skipped and the C-2 release control is terminated. In the next step S32, under conditions in which the aforementioned exclusion still holds (i.e., the 6th to 4th speed shift has still not finished) determination is executed as to whether a shift command for shifting to the third speed is established (3rd determination). As a result, a sharp distinction with shifts to the other speeds is established. In this way, once it is confirmed that execution of this control is appropriate, the shift progression state (Shift R) determination is initiated in step S33 to decide a timing of initiation of the C-2 clutch release. The determination index for the shift progression state in this case is set as a value (Shift R_S1) based upon the transmission input shaft speed. In addition, when this determination is satisfied (Shift R>Shift R_S1), a pressure reduction control ($P_{C-2}=\alpha_1 f_1(t_2)+\beta f_2(P_{B-1})+\gamma f_3(P_{C-1})$) for a servo hydraulic pressure ($P_{C-2}$) of the C-2 clutch is entered in step S34.

Here, $f_1(\ )$ indicates a necessary C-2 clutch pressure with respect to an input torque in the sixth speed state; $f_2(\ )$ indicates a necessary C-2 clutch pressure correction amount for maintaining the sixth speed state without the C-2 clutch sliding with respect to change in the B-2 brake pressure; $f_3(\ )$ indicates a gain used at the time of respective hydraulic pressure calculations for $\alpha$, $\beta$, and $\gamma$ that indicate the C-2 clutch pressure correction amount according to change in a C-2 clutch load torque with respect to change in the C-1 clutch pressure. A C-1 clutch retaining torque $t_2$ in this case is derived from $t_2=t_0-g(\omega_0)$, where, to is the input torque not including an inertia portion, $\omega_0$ is an estimated rotation acceleration for calculating inertia along with the progression of shifting, and $g(\omega_0)$ is a resultant inertia torque.

While the pressure reduction processing is executed in this manner, in the next step S35, a shift progression state (Shift R) determination is executed for determining whether fourth speed synchronization is about to occur (hereinafter referred to as "presynchronization determination") (Shift R>S_End 3). When the pre-synchronization determination is satisfied, on this occasion, the next stage of the pressure reduction control $(P_{C-2}=\alpha_2 f_1(t_2)+\beta f_2(P_{B-1})+\gamma f_3(P_{C-1}))$ is entered in step S36. In this case, $\alpha_2$ indicates a gain used when calculating the hydraulic pressure.

Figure 9:
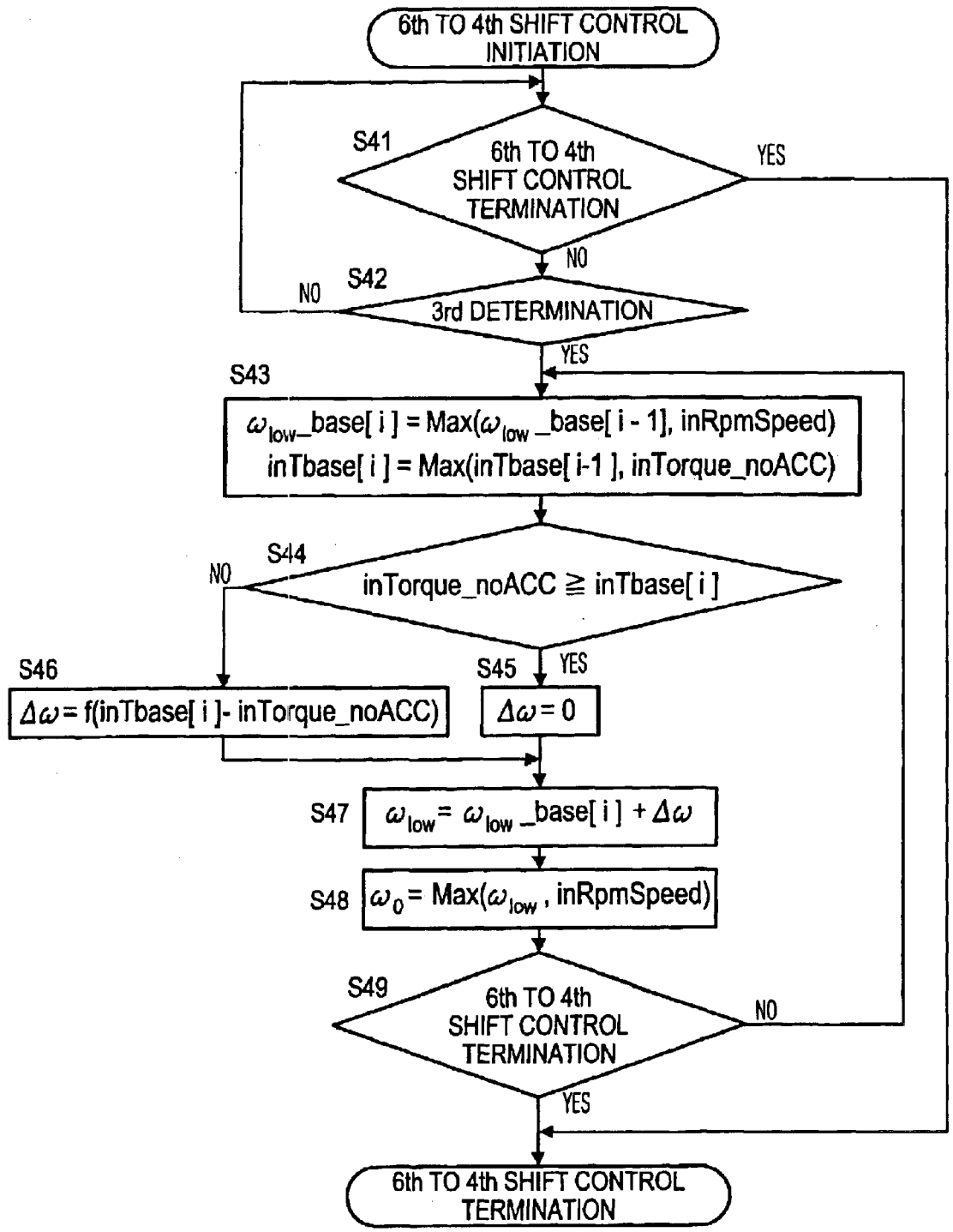
FIG. 9 is a flow chart for setting an estimated rotation acceleration when shifting from the 6th to the 3rd speed.

FIG. 9 is a flow chart for setting the estimated rotation acceleration $(\omega_0)$ for calculating inertia along with shift progression. In this flow, determination is executed as to whether the 6th to 4th speed shift is in progress in the initial step S41. With this as a fundamental prerequisite, in the next step S42, determination is executed as to whether a 6th to 3rd speed shift command is satisfied at this stage. In this way, it is confirmed whether a 6th to 3rd speed shift command is established during progression of the 6th to 4th speed shift. In the processing of the following steps S43 to S48, a setting $(\omega_0=\text{Max}(\omega_{low}, \text{inRpmSpeed})$ for the estimated rotation acceleration $(\omega_0)$ at each time point is successively changed along with progression of shifting.

In the processing of the initial step S43 the following two types of processing are executed. The first is an input shaft rotation acceleration maximum value update processing $(\omega_{low\_}\text{base}[i])=\text{Max}(\omega_{low\_}\text{base}[i-1])$ in which a value $(\omega_{low\_}\text{base}[i-1])$ of the rotation acceleration speed $(\omega_{low})$ at each time point, which is a base, is updated with the value which has a larger absolute value among the actual input shaft rotation acceleration (inRpmSpeed), at each time, and the rotation acceleration speed $(\omega_{low\_}\text{base}[i-1])$ for one time before this actual speed. The second, which is similar to the above, is an inertia portion excluded input torque maximum value update processing (inTbase[i]=Max (inTbase[i]=Max(inTbase[i-1], inTorque_noACC) in which a value (inTbase[i]) of the input torque at each time point is updated with the value which has a larger absolute value among the successively-updated input torque at that point excluding the inertia portion (inTorque_noACC), and the input torque excluding the inertia portion for one time before the input torque at that point (inTbase[i-1]). In addition, in the next step S44, an absolute value magnitude comparison determination is executed for the actual input torque (inTorque_noACC) excluding the inertia portion and the previously calculated input torque (inTbase[i]). When this determination is satisfied, reduction of the input torque has not occurred and thus in the next step S45, the rotation acceleration speed reduction tolerance ($\Delta\omega$) is set to 0. On the other hand, when this determination is not satisfied, reduction of the input torque has occurred and thus in step S46 the rotation acceleration speed reduction tolerance ($\Delta\omega$) is set using a function of a difference (inTbase[i]-inTorque_ noACC) between the calculated input torque maximum value (inTbase[i]) and the input torque excluding the inertia portion (inTorque_noACC). Using the rotation acceleration speed reduction tolerance ($\Delta\omega$) obtained in this way, in the next step S47, the rotation acceleration speed ($\omega_{low}$), which is a base, is calculated ($\omega_{low}=\omega_{low\_}\text{base}[i]+\Delta\omega$) by adding the rotation acceleration speed reduction tolerance ($\Delta\omega$) to the value ($\omega_{low\_}\text{base}[i]$) at each time point. In addition, in the next step S48, the estimated rotation acceleration ($\omega_0$) is set to the value which is larger among the rotation acceleration speed ($\omega_{low}$), which is a base, and the actual input shaft rotation acceleration (inRpmSpeed). The setting of this estimated rotation acceleration ($\omega$o) is continued until the 6th to 4th speed shift termination determination is satisfied in the next step S49.

Figure 10:
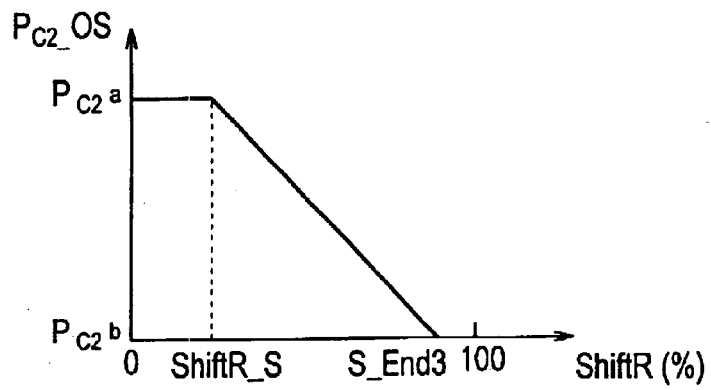
FIG. 10 is a hydraulic pressure characteristics diagram showing a setting method for a margin of safety portion of a hydraulic pressure for release of the C-2 clutch.

Moreover, the aforementioned input torque can be obtained by multiplying an engine torque with a speed ratio, which are derived in the following way. The engine torque is derived from a map of the throttle angle and the engine speed. The speed ratio is derived from an input speed and an output speed of the torque converter. In addition, a conversion of the input torque to the hydraulic pressure is calculated by dividing the input torque by a multiple of a pressure receiving area of the hydraulic servo piston of the corresponding engagement element, a friction material number, an effective radius and a friction coefficient, and adding a piston stroke pressure to this value. However, it is desirable that the actual hydraulic pressure supplied to the hydraulic servo incorporates a margin of safety. In this case, as shown in FIG. 10, the margin of safety portion of the hydraulic pressure ($P_{C2\_}0S$) is set so as to reduce from $P_{C2}a$ to $P_{C2}b$ along with the progression of shifting. In this case, the final value $P_{C2}b$ of the margin of safety portion of the hydraulic pressure ($P_{C2\_}0S$) is set to 0, and thus the C-2 clutch release (slip) initiates. However, this time point is set to a point prior to when the shift progression has reached 100%.

Returning to FIG. 8, while the aforementioned pressure reduction processing is continued, in the next step S37, shift progression state (Shift R) determination (Shift R>S_End 2) is continued. In addition, when this determination is satisfied, the fourth speed is completely achieved and thus, following this, a 4th to 3rd speed shift control (the 4th to 3rd speed shift control initiation) is entered.

When the 4th to 3rd shift control is entered, the pressure reduction processing (sweep down by the gradient of $dP_{C2}d$) is executed in step S38 in order to completely remove the hydraulic pressure of the C-2 clutch servo. This processing also completes itself when the solenoid valve 2 reaches full output, and thus the the 4th to 3rd shift control for releasing the C-2 clutch is terminated without executing any particular monitoring determination. In this way, the C-2 release control is terminated.

Figure 11:
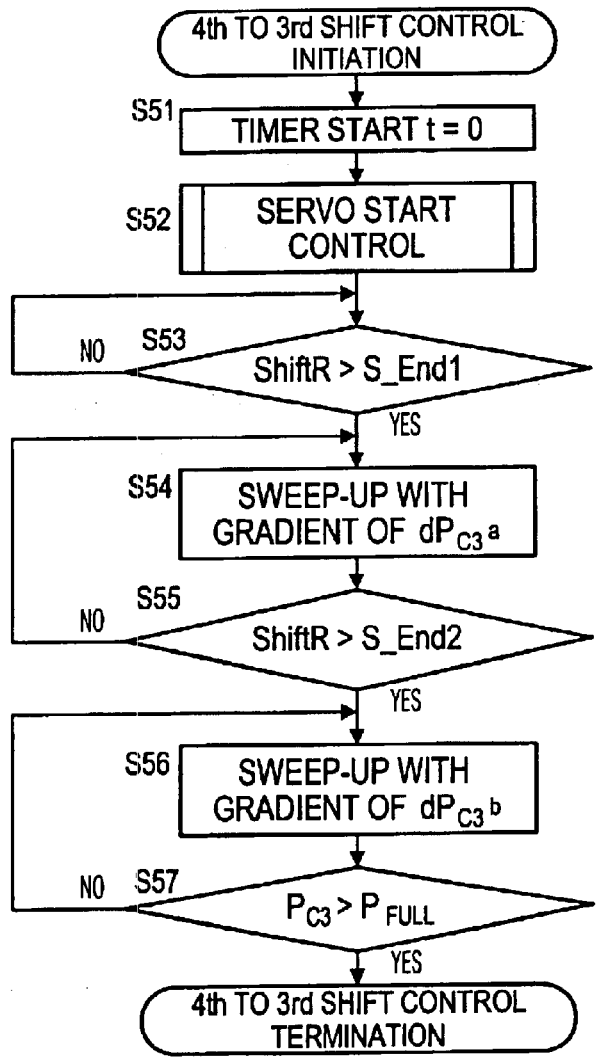
FIG. 11 is a flow chart of a C-3 clutch engagement control when shifting from the 6th shift speed to the 3rd shift speed.

Next, FIG. 11 shows a control flow for engagement of the C-3 clutch that is the fourth engagement element. This control is substantially the same as the aforementioned C-1 clutch engagement control and only differs with respect to the start of timing. In this control a timer is started (time start t=0) in the initial step S51. Next, in step S52, a servo start control sub-routine processing is executed. This processing includes: a first application of hydraulic pressure for filling a hydraulic servo cylinder of the C-1 clutch; and maintenance of a piston stroke pressure which follows this first application for charging a gap between a hydraulic servo piston and a friction member of the engagement element. This processing is the same as that commonly known and normally executed for clutch engagement. Next, in step S53, the progression state (Shift R) is determined (Shift R>S_ End 1) as an index for determining shifting progression. This shift progression state (Shift R) is the same as described above. Initially, this determination is not satisfied (No) and thus shifting progresses until the determination is satisfied. When the determination is satisfied (Yes), pressure increase (sweep up at the gradient of $dP_{C3}a$) is initiated for engagement of the C-3 clutch, in step S54. In addition, while this pressure increase is continued, it is determined in the next step S55, from the shift progression state (Shift R), whether third speed synchronization has been reached (Shift R>S_ End 2). This determination is initially not satisfied either, and thus sweep up is continued by repeating a processing loop that returns to step 54, until shift progression leads the determination to become satisfied. When the determination of step S55 is satisfied, next, in step S56, processing is executed in which, this time, the servo hydraulic pressure is increased (sweep up at the gradient of $dP_{C3}b$) as far as line pressure in order to maintain engagement of the C-3 clutch reliably. At the same time, in the next step S57, determination of whether the servo hydraulic pressure has reached the line pressure is repeated. In this way, when the determination of step S57 is satisfied, the 4th to 3rd shift control for the C-3 clutch engagement control is terminated.

Figure 12:
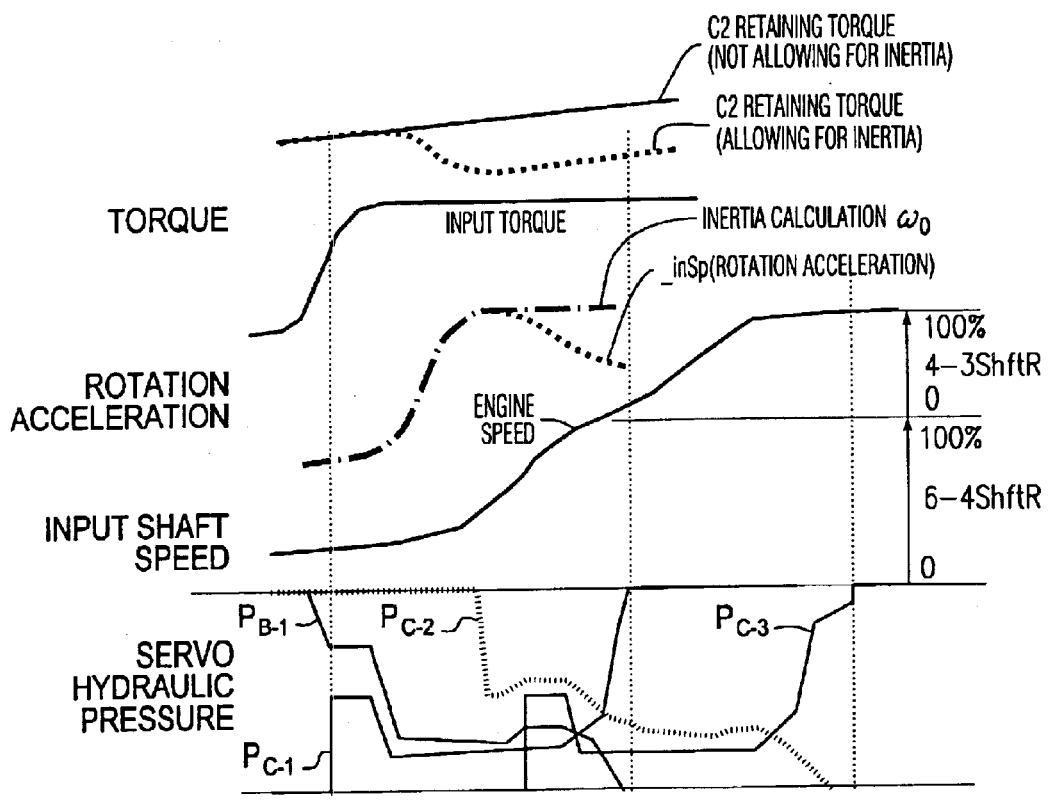
FIG. 12 is a time chart showing a relationship between a control relationship of each engagement element and progression of shifting, when there is no reduction in an input torque during shifting from the 6th to the 3rd speed.

FIG. 12 is a time chart showing the aforementioned operation of the four engagement elements for the 6th to 3rd shift control, in the form of changes in the servo hydraulic pressures. The time chart shows relationships between the four engagement elements and the input shaft speed, the input shaft rotation acceleration (_inSP), the estimated rotation acceleration ($\omega_0$), the input torque ($t_0$), and the C-2 clutch retaining torque. More particularly, the time chart shows a case in which there is no torque reduction during the progression of shifting, such as a power ON downshift. Accordingly, as can be seen from the figure, first, the servo hydraulic pressure $P_{B-1}$ of the B-1 brake is temporarily reduced to a pressure slightly lower than the line pressure. The C-1 clutch engagement control is initiated in line with this timing, and the servo hydraulic pressure $P_{C-1}$ of the C-1 clutch is raised to the first fill pressure. In addition, upon completion of the first fill, the servo hydraulic pressure $P_{B-1}$ of the B-1 brake is reduced until the predetermined pressure $P_{B1}c$ of sweep down initiation and the servo hydraulic pressure $P_{C-1}$ is reduced until the initial pressure of sweep up initiation. In addition, the servo hydraulic pressure $P_{B-1}$ of the B-1 brake is reduced under feedback control at the constant gradient $dP_{B1}$, and the servo hydraulic pressure $P_{C-1}$ of the C-1 clutch is increased at the constant gradient of $dP_{C1}a$. As a result, the 6th to 4th shift is initiated and the input shaft speed starts to increase.

At this time, in the gear train shown in FIG. 2, the start of slip of the B-1 brake leads the sun gear S3 and the sun gear S2 to move in the reduced speed and increased speed directions, respectively, centering on the engagement point of the C-2 clutch which is being engaged. As a result, a rotating element side of the B-1 brake begins rotating from a held zero rotation state to the forward direction. Furthermore, in response to reduced speed rotation of the input element side, an output element side of the C-3 clutch increases speed and moves toward the forward rotation direction from reverse rotation. On the other hand, the C-1 clutch changes from a forward rotation state having a speed substantially increased with respect to the engine rotation toward a decreased speed direction such that its rotation speed becomes equal to the engine speed.

Next, once the timing of the C-2 clutch release control initiation is reached based on the increase in the input shaft speed, the servo hydraulic pressure $P_{C-2}$ of the C-2 clutch is reduced at one time to a hydraulic pressure at which release initiation (slip) does not occur, and from this point, the hydraulic pressure is reduced gradually under control based upon the estimated rotation acceleration $\omega_0$ in line with the input shaft rotation acceleration (_inSp indicated by a bold dotted line in the figure). From this stage, the input shaft rotation acceleration (inSp) starts to reduce as shown by the bold dotted line in the figure under the influence of the feedback control of the servo hydraulic pressure of the B-1 brake. However, the estimated rotation acceleration $\omega_0$ from the input torque monitoring is maintained at a constant value as shown by the bold dashed line in the figure, as a result of the previous step S48 processing. In this way, the 6th to 4th shift progression continues toward synchronization with the fourth speed, and when the determination is satisfied that the fourth speed pre-synchronization, (S_End 1) is 70% complete, based on the input shaft speed, at this point, pressure increase of the servo hydraulic pressure $P_{C-1}$ of the C-1 clutch is initiated by a first stage sweep up, and the C-1 clutch engagement (slip) progresses. As a result, when the C-1 clutch engagement reaches 90% complete, the fourth speed pre-synchronization determination (S_End 2) is satisfied based on the input shaft speed, and thus the servo hydraulic pressure $P_{C-1}$ of the C-1 clutch switches to a second stage pressure increase state in which pressure increases toward the line pressure. On the other hand, the servo hydraulic pressure of the C-2 clutch in the midst of the pressure reduction control is controlled such that the hydraulic pressure becomes appropriate in order to reach a point just prior to release initiation when the fourth speed pre-synchronization (S_End 3) determination is satisfied due to the pressure reduction control. As a result of this control, the C-2 clutch retaining torque $t_2$ changes with a constant pressure reduction amount as shown by the bold dotted line in the figure, in contrast to the retaining torque which does not allow for inertia.

At this point, in the gear train, the C-2 clutch starts to slip and reverse direction rotation occurs, and immediately afterwards, the C-1 clutch having reduced speed due to moving from a released reduced speed state to a slipping reduced speed state moves toward zero rotations at engagement. On the other hand, the rotation of the C-3 clutch continues to increase in speed. In addition, when it is determined that the servo hydraulic pressure $P_{C-1}$ of the C-1 clutch has reached the line pressure, the C-3 clutch engagement control is initiated. As a result, the rotation of the C-3 clutch reaches a peak at the time of fourth speed synchronization (4th speed is 100% synchronized), then starts to reduce, and finally moves toward zero rotations at complete engagement, via a reduced speed state resulting from slip. The hydraulic pressure control in accordance with this progression of engagement of the C-3 clutch is the same as that for the case of the C-1 clutch, except that the third speed is substituted in the 70% pre-synchronization and pre-synchronization determinations. Finally, when the third speed synchronization is reached due to progress of the 4th to 3rd speed shift, the servo hydraulic pressure $P_{C-2}$ of the C-2 clutch is completely released by the sweep down, and the servo hydraulic pressure $P_{C-3}$ increases to the line pressure due to full output. In this way, the 6th to 3rd shift is achieved through a continuous 6th to 4th to 3rd shift.

Figure 14:
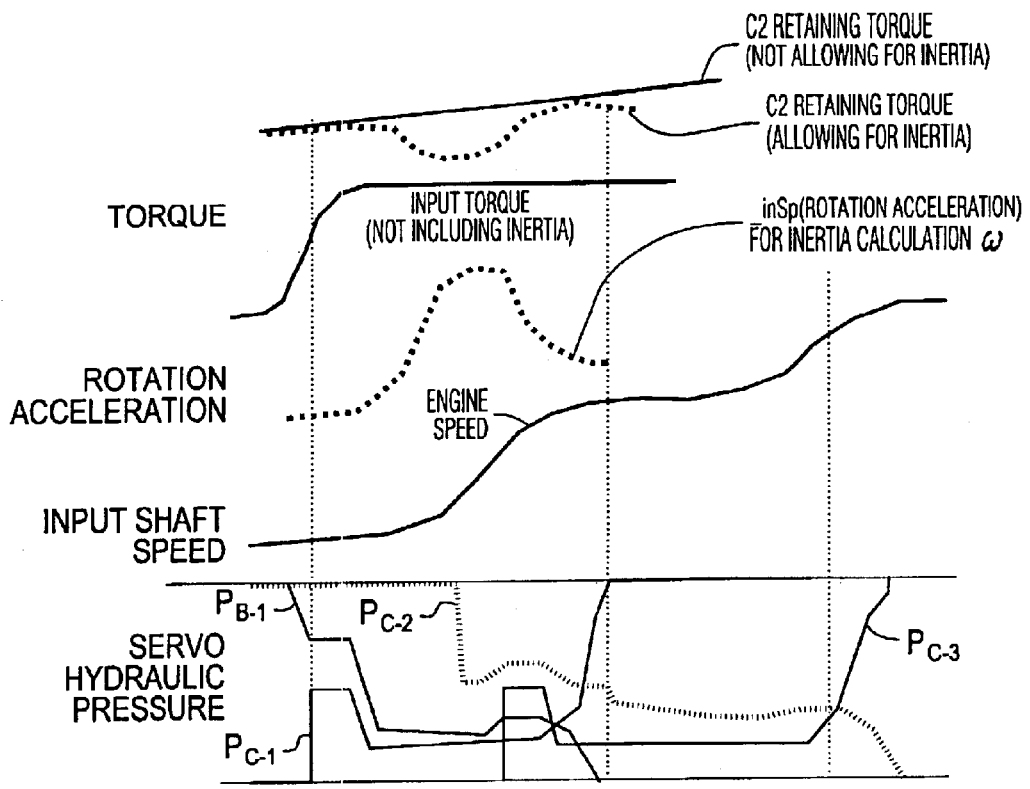
FIG. 14 is a time chart showing a relationship between the control relationship of each engagement element and the progression of shifting when there is no reduction in the input torque, when a correction control of the estimated rotation acceleration is not executed during shifting from the 6th to the 3rd speed.

As a contrast to the aforementioned 6th to 3rd shift, FIG. 14 is a time chart for a 6th to 3rd shift in which the estimated rotation acceleration ($\omega$) is simply set in accordance with change of the input shaft rotation acceleration (_inSp shown by a bold dotted line in the figure). In this time chart, at the time of movement from the 6th to 4th shift to the 4th to 3rd shift, the estimated rotation acceleration ($\omega$) becomes a low value due to, for example, reduction of the input shaft rotation acceleration due to increase of the B-1 brake pressure, or the like. Accordingly, the C-2 clutch retaining torque that allows for the inertia portion (a bold dotted line in the figure) becomes larger, and thus reduction of the servo hydraulic pressure of the C-2 clutch is delayed. Along with this, the timing of initiation of the 4th to 3rd shift is delayed, or alternatively, retardation occurs of the input shaft speed at the time of the 4th to 3rd shift initiation. Accordingly, the changeover time of release of the C-2 clutch which essentially completes the 4th to 3rd shift and the C-1 clutch engagement is delayed substantially. In contrast to this, in the time chart shown in FIG. 12, it is clear from the change in the input shaft speed that the changeover time is shortened significantly. In this way, it is possible to shorten the shift time for the 6th to 3rd shift by setting the estimated rotation acceleration ($\omega_0$).

Figure 13:
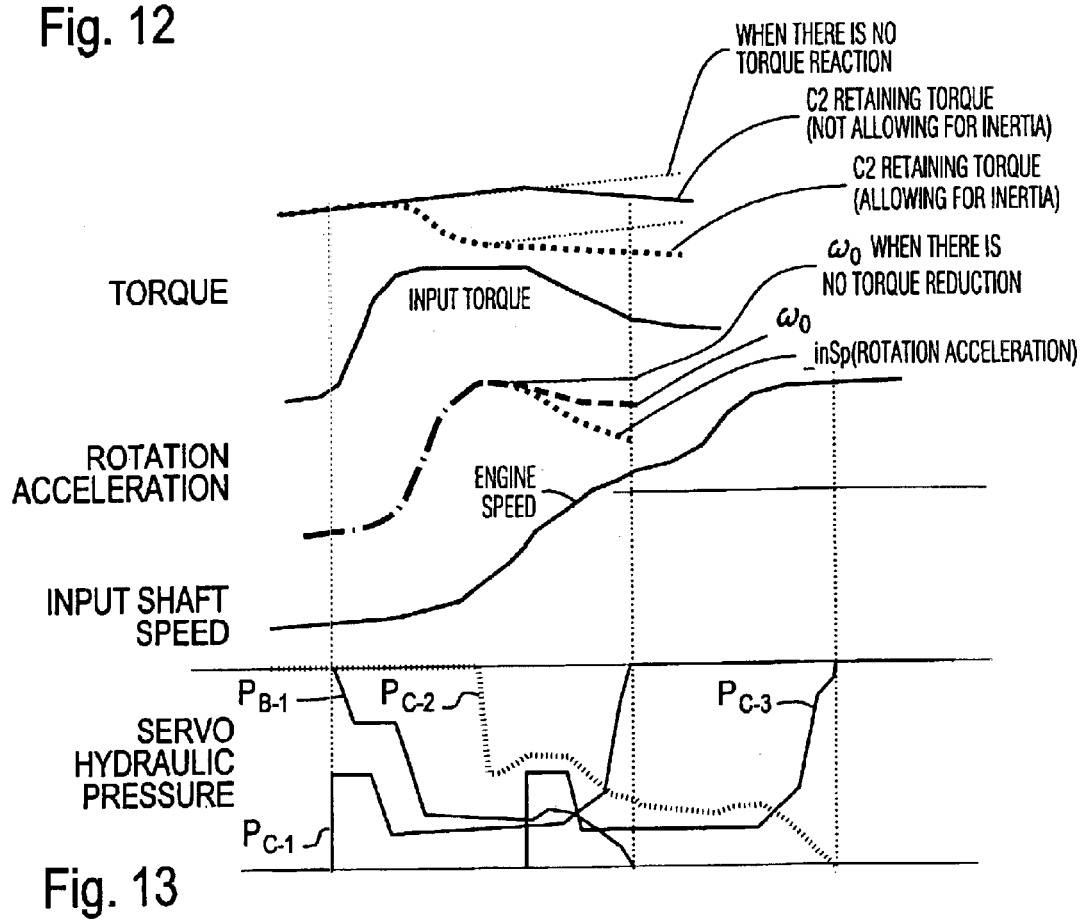
FIG. 13 is a time chart showing a relationship between the control relationship of each engagement element and the progression of shifting, when there is reduction in the input torque during shifting from the 6th to the 3rd speed.

The time chart of FIG. 13 shows the same contents as the time chart in FIG. 12, for a case in which there is accompanying input torque reduction, such as during manual downshift, or the like. In this case, when the input torque decreases during shifting as shown by the solid line in the drawing, the estimated rotation acceleration $\omega_0$ for inertia calculation shown by a bold broken line is set to a value between the estimated rotation acceleration for inertia calculation $\omega_0$ (shown by a thin dotted line in the figure) when torque is reduced and the input shaft rotation acceleration (a bold dotted _inSp line in the figure), due to the processing of the previous step S48. Based on this, the C-2 clutch pressure is controlled so as to sweep down. By doing this, the input rotation acceleration reduction due to the actual input torque reduction, and the input rotation acceleration (_inSp) reduction due to the influence of the feedback control of the B-1 brake release are clearly distinguished, and thus setting of the rotation acceleration speed $\omega_0$ for inertia calculation becomes more suitably for the progression of shifting. Due to this, the pressure reduction control for the C-2 clutch pressure is controlled appropriately.

Figure 15:
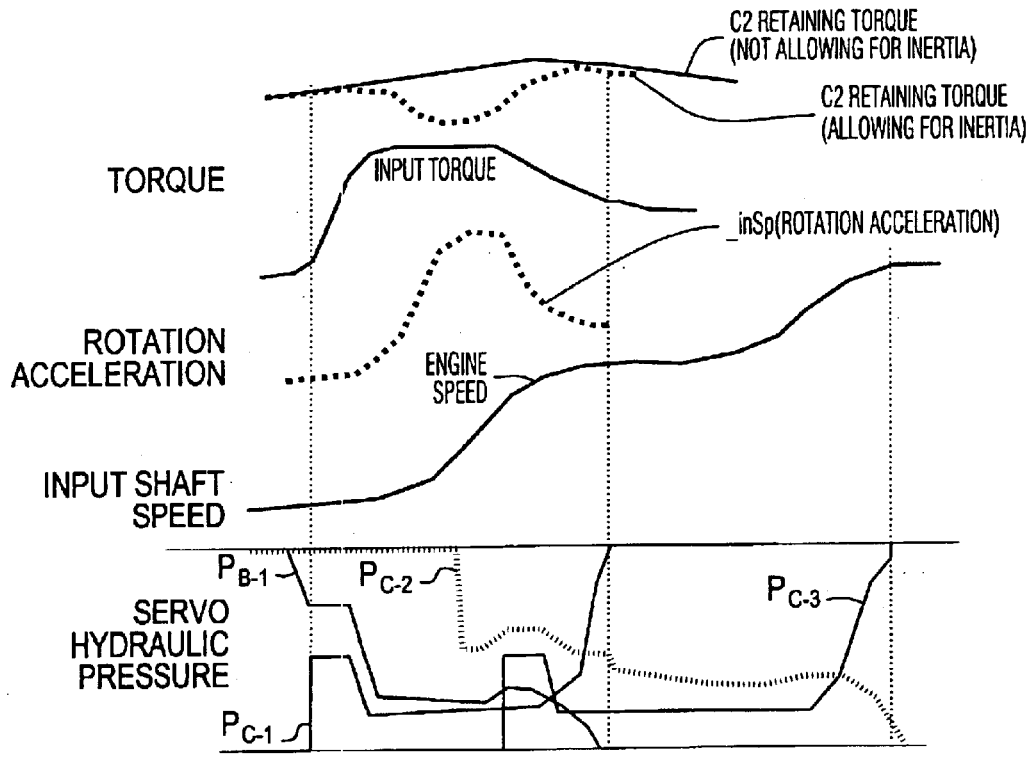
FIG. 15 is a time chart showing a relationship between the control relationship of each engagement element and the progression of shifting when there is reduction in the input torque, when the correction control of the estimated rotation acceleration is not executed during shifting from the 6th speed to the 3rd speed.

In relation to this, FIG. 15, as a contrast to the aforementioned 6th to 3rd shift accompanied by reduction in torque, shows a time chart for a 6th to 3rd shift in which the rotation acceleration for calculating inertia ($\omega$) is simply set in accordance with change of the input shaft rotation acceleration (_inSp). In this time chart, at the time of movement from the 6th to 4th shift to the 4th to 3rd shift, the retaining torque of the C-2 clutch moving temporarily in a released direction is restored along with reduction of the input torque. As a result, the C-2 clutch enters a state in which it returns in an engagement direction, and thus the timing of initiation of the 4th to 3rd shift is delayed, or alternatively, retardation occurs of the input shaft speed at the time of the 4th to 3rd shift initiation. Accordingly, the changeover time of release of the C-2 clutch which essentially completes the 4th to 3rd shift and the C-1 clutch engagement is delayed substantially.

To summarize the above, when calculating the retaining torque of the second shift release element (the C-2 clutch) during the initial shift (the 6th to 4th shift), if the input rotation acceleration (_inSp) is used without change and the inertia portion is considered, the rotation change at the time of initial shift (the 6th to 4th shift) termination is gentle, and thus the deducted inertia torque decreases. Accordingly, the retaining torque of the final shift (the 4th to 3rd shift) release element (the C-2 clutch) is calculated so as to be too high, and thus initiation of rotation change of the final shift (the 4th to 3rd shift) is delayed, and the input rotation acceleration becomes smaller as compared to the initial shift (the 6th to 4th shift), and thus there is a possibility that shift feel will be impaired. In contrast to this, according to this embodiment, when calculating the retaining torque of the second shift release element (the C-2 clutch) during the initial shift (the 6th to 4th shift) the inertia portion is calculated based on the actual rotation acceleration speed (_inSp). Thus, excluding the case when the input torque falls along with decrease of the throttle angle, the decrease in the rotation acceleration speed (_inSp) is thought to result from feedback control based on the hydraulic pressure control of the initial shift release element (the B-1 brake). Accordingly, the estimated rotation acceleration (inertia torque) used in calculation of the load torque of the final shift release element too (the C-2 clutch) is not reduced (refer to step S45 of the control flow of FIG. 9) and is maintained at the same value. In the case of the input torque decreasing, calculation is executed (refer to step S46 of the control flow of FIG. 9) of the retaining torque that permits decrease of the estimated rotation acceleration $\omega_0$ used for calculating inertia torque in accordance with only the torque reduction amount. By doing so, it is possible to correctly calculate the retaining torque (including the inertia portion) of the final shift release element (the C-2 clutch) during the initial shift (the 6th to 4th shift), regardless of whether the shift state is power ON or power OFF. Furthermore, a final shift release hydraulic pressure control becomes possible in which movement from the initial shift (the 6th to 4th shift) to the final shift (the 4th to 3rd shift) can be continuously executed.

Here, only the case of the 6th to 3rd shift has been explained as an example of shifting requiring engagement and release of the four engagement elements of the described gear train. However, in the case of the 5th to 2nd shift too, the configuration of the shift control is the same, except for that the engagement elements that are subject to the control are changed. In this case, the first engagement becomes the C-2 clutch, the second engagement element becomes the C-3 clutch, and the third engagement element becomes the C-1 clutch. However, a unique characteristic of this gear train is that it adopts a configuration using engagement (locking) of the F-1 one way clutch as the fourth engagement element in place of engagement of the B-1 brake, in order to realize the final shift. As a result, the case of the 6th to 3rd shift is different since hydraulic pressure control for engagement of the B-1 brake during the final shift stage (the 3rd to 2nd shift) is no longer necessary. Accordingly, the control is simplified in this respect.

It should be noted that herein the present invention has been explained using a representative embodiment applied to a particular gear train. However, the spirit of the present invention is not limited to the described gear train, and may be applied to any gear train in which a relationship of engagement and release of four engagement elements involves simultaneous changeover of the four elements.

What is claimed is:

1. A shift control apparatus for an automatic transmission requiring operation of four engagement elements when shifting from a first shift speed to a second shift speed, and achieving the first shift speed by engaging a first engagement element and a second engagement element, and achieving the second shift speed by engaging a third engagement element and a fourth engagement element, comprising:

a shift control unit that controls a state up to initiation of release of the second engagement element in accordance with an estimated rotation acceleration changed in accordance with an input torque up to initiation of release of the second engagement element, the estimated rotation acceleration being set in accordance with an input shaft rotation acceleration increased in accordance with release of the first engagement element and the input torque prior to initiation of the release of the second engagement element.

2. The shift control apparatus for an automatic transmission according to claim 1, wherein a maximum input shaft rotation acceleration up to initiation of release of the second engagement element is successively updated and set as an upper of the estimated rotation acceleration.

3. The shift control apparatus for an automatic transmission according to claim 2, wherein the estimated rotation acceleration is set such that the estimated rotation acceleration is maintained when input torque increases during a period up to initiation of release of the second engagement element, and is set such that the estimated rotation acceleration decreases in accordance with the input torque when the input torque decreases.

4. The shift control apparatus for an automatic transmission according to claim 3, wherein the estimated rotation acceleration is determined by subtracting a decreased amount of the estimated rotation acceleration, which is determined in accordance with a difference between a maximum value of the input torque up to initiation of release of the second engagement element and a present input torque, from the maximum value of the input shaft rotation acceleration up to initiation of release of the second engagement element.

5. The shift control apparatus for an automatic transmission according to claim 4, wherein the input torque does not include inertia torque generated in a drive train by a torque that is input into the automatic transmission.

6. The shift control apparatus for an automatic transmission according to claim 5, wherein the second engagement element is controlled by a hydraulic pressure of a hydraulic servo, and the hydraulic pressure is determined in accordance with a hydraulic pressure set according to the estimated rotation acceleration and a hydraulic pressure of a hydraulic servo of the first engagement element and the third engagement element, respectively.

7. The shift control apparatus for an automatic transmission according to claim 6, wherein the hydraulic pressure of the hydraulic servo for maintaining engagement of the second engagement element prior to release is set to a hydraulic pressure that is the smallest necessary in order to maintain the first shift speed, based on the estimated rotation acceleration.

8. The shift control apparatus for an automatic transmission according to claim 7, wherein the hydraulic pressure of the hydraulic servo of the second engagement element is set to a hydraulic pressure that includes the determined hydraulic pressure and a predetermined margin of safety portion of the hydraulic pressure.

9. The shift control apparatus for an automatic transmission according to claim 8, wherein the predetermined margin of safety portion of the hydraulic pressure decreases in accordance with progression of shifting.

10. The shift control apparatus for an automatic transmission according to claim 6, wherein the hydraulic pressure for the hydraulic servo of the second engagement element is determined in accordance with the input torque, and the inertia torque generated in the drive train that is determined based on the estimated rotation acceleration.

11. The shift control apparatus for an automatic transmission according to claim 1, wherein the shift control unit executes control such that release of the second engagement element is initiated following initiation of release of the first engagement element, and engagement of the fourth engagement element is completed following completion of engagement of the third engagement element.

12. The shift control apparatus for an automatic transmission according to claim 11, wherein the shift control unit executes control such that release of the second engagement element is initiated prior to completion of engagement of the third engagement element.

13. The shift control apparatus for an automatic transmission according to claim 1, wherein the shift control unit initiates a release control of the second engagement element during control in which the first engagement element is released and the third engagement element is engaged.

14. The shift control apparatus for an automatic transmission according to claim 13, wherein the automatic transmission achieves the first shift speed by engaging the first engagement element and the second engagement element, achieves the second shift speed by engaging the third engagement element and the fourth engagement element, and achieves a third shift speed by engaging of the second engagement element and the third engagement element.

15. The shift control apparatus for an automatic transmission according to claim 14, wherein the estimated rotation acceleration is determined based on a target shift time for a shift from the first shift speed to the third shift speed, and respective gear ratios and output rotation numbers for the first shift speed and the third shift speed.

16. The shift control apparatus for an automatic transmission according to claim 1, wherein a shift from the first shift speed to the second shift speed is a downshift, and input torque is reduced during this downshift.

* * * * *